THIN FILM SHIFT REGISTER

Filed May 5, 1964 3 Sheets-Sheet 1

INVENTOR.
HARRISON W. FULLER
BY
Philip J. McFarland
ATTORNEY

INVENTOR.
HARRISON W. FULLER
BY
Philip J McFarland
ATTORNEY

THIN FILM SHIFT REGISTER

Filed May 5, 1964 3 Sheets-Sheet 3

INVENTOR.
HARRISON W. FULLER
BY
Philip J McFarland
ATTORNEY 3,369,225
THIN FILM SHIFT REGISTER
Harrison W. Fuller, Needham, Mass., assignor to Laboratory for Electronics, Inc., Boston, Mass., a corporation of Delaware
Filed May 5, 1964, Ser. No. 364,914
5 Claims. (Cl. 340—174)

ABSTRACT OF THE DISCLOSURE

The thin magnetic film devices are disposed one above the other. One device acts as a storage medium and the other as a scanning medium. The storage medium is provided with means to produce magnetic domains having selected directions of magnetization representing digital information. The scanning medium is provided with means to create successive moving domains whose fringe field magnetically couple to the domains in the storage medium. A restraining field which retards the motion of the domains serves to control their density. By these means, domains of different magnetization are coated in the storage medium and their travel passed a readout coil is controlled.

Figure 1:
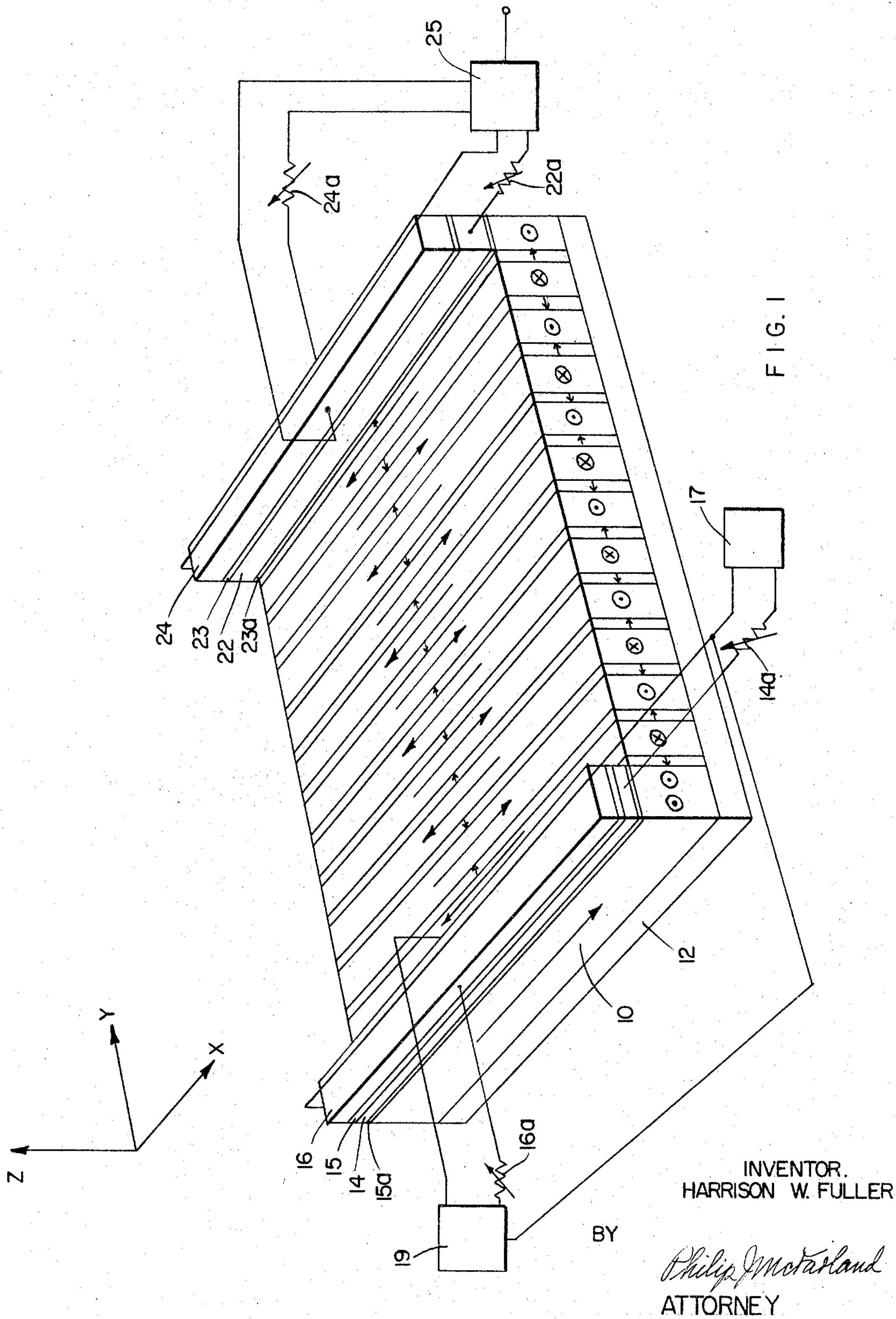

This invention relates generally to apparatus and method for processing data in a data processing system and particularly to apparatus and method of such character whereby data is at least temporarily stored in a magnetic storage medium in the form of alternately magnetized domains.

In the data processing art, storage of data in a magnetic storage medium in the form of oppositely magnetized domains is often required. Experience has proven, however, that the amount of data which may be stored in almost all known types of magnetic storage mediums is relatively low as compared to other kinds of data storage mediums, as photographic film. Consequently, a great deal of effort has been expended in the development of "high density" magnetic storage mediums to the end that more efficient utilization of magnetic storage apparatus may be attained.

As a result of recent investigations in the data processing art, it has been found that relative movement between a magnetic storage medium and a magnetic transducer is not essential to the magnetic storage process. This find has, in turn, led to the development of "writing-limited" magnetic storage apparatus, in contrast to the "reading-limited" magnetic storage apparatus derived from Poulsen (U.S. Patent No. 822,222). In other words, it is now known that magnetic storage apparatus may be designed in which storage density is limited by the characteristics of the "writing" transducer and/or the properties of the magnetic storage medium actually used, rather than by the characteristics of the "reading" transducer.

The magnetic storage apparatus, described in detail in my co-pending application entitled High Capacity Data Processing Techniques, Ser. No. 697,058, filed Nov. 18, 1957, now Patent No. 3,104,471 and assigned to the same assignee as the present application, is an example of a known "writing-limited" system. In such apparatus a magnetic storage medium, as a film of a magnetic material having a relatively high coercivity, is disposed adjacent to a magnetic scanning medium, as a film of a magnetic material having a relatively low coercivity. When the magnetization of a portion of the scanning medium is reversed by domain wall rotation in accordance with the data to be stored, oppositely magnetized domains and domain walls representative of such data are propagated through the scanning medium. The fringe field around each domain wall then interacts with the magnetic storage medium to change the magnetization of successive portions thereof in accordance with the data being processed. Read-out of such stored data may be accomplished, whenever desired, by sensing the effect of the storage medium upon the velocity of propagation of additional domains and domain walls in the scanning medium.

Although the mechanical simplicity and operational characteristics of the just-cited apparatus have been highly advantageous, practical difficulties limit its use. Thus, it is now clear that the circuitry required to generate and propagate domain walls in accordance with data to be processed is rather complicated and critical in adjustment. Further, since fringe fields of domain walls are used in both the "writing" and the "reading" operation random variations in the maximum attainable density of oppositely magnetized domains occur. Further, the magnetic characteristics of the magnetic medium actually used limit the storage density of data in such a medium. That is, the storage density of data in the cited apparatus is limited by the so-called "normal equilibrium" condition (meaning the condition in which the number of domains which may normally exist in a magnetic material is a maximum) of the scanning medium or the storage medium. The speed of operation of the cited apparatus is also limited by the "normal equilibrium" condition of the magnetic mediums actually used, in that the maximum velocity of propagation of domains and domain walls in any magnetic medium may not exceed their velocity of propagation in the "normal equilibrium" condition.

Although the cited apparatus is primarily adapted to the storage of data, it may also be utilized either as an element of a recirculating register or a signal delay device. Whatever the use to which the cited apparatus is put, however, limitations just discussed apply. Further, when the cited apparatus is used in a register or a signal delay device at least one of its magnetic materials should be in its "normal equilibrium" condition to obviate instability in operation. This means, in turn, that often-desired controlled changes of time delay or circulating time are difficult, if not impossible, to attain. Obviously, such a restriction on operational characteristics is, if at all possible, to be avoided if full advantage of the cited apparatus is to be taken.

Therefore, it is an object of this invention to provide improved data processing apparatus utilizing films of magnetic materials in which data may be processed and stored, the density of such data in being substantially greater than the density of data in known apparatus of a similar character.

Another object of this invention is to provide improved data processing apparatus utilizing a magnetic medium in which the density of data being processed may be varied, in a controlled manner, between wide limits so as to permit control of operational characteristics of the apparatus.

Another object of this invention is to provide data processing apparatus utilizing a magnetic medium which is adapted to use with simple and easily adjusted circuitry.

Another object of this invention is to provide an improved data processing apparatus in a system utilizing magnetic mediums to store, at least temporarily, data being processed.

These and other objects of the invention are attained generally in data processing apparatus by providing a storage assembly comprising: a pair of closely-spaced anisotropic magnetic films, one film (hereinafter referred to as the scanning medium) being fabricated from a magnetic material of lower coercivity that the material of the second film (hereinafter referred to as the storage medium) and the axes of anisotropy of the two mediums being substantially parallel to each other; means adapted to generate and propagate successive oppositely magnetized domains at a constant rate in the scanning medium, thereby creating a series of moving domain walls, the fringe field of each moving domain wall extending toward the storage medium; means adapted to generate, in accordance with the data being processed, oppositely magnetized domains in a portion of the storage medium separated from one another by domain walls each of which has a fringe field coupled magnetically to the fringe field of a moving domain wall in the scanning medium whereby each domain and domain wall in the storage medium is forced to move along the storage medium at the same speed as the speed of the domain wall in the scanning medium to which it is coupled; adjustable restraining means, coacting at least with the scanning medium to control the speed at which domains and domain walls move therein, for controlling the density of domains in both the scanning medium and the storage medium; and means, responsive to such ones of the domain walls in the storage medium as are allowed to pass the restraining means, for producing an electric signal which is indicative of the data stored in the storage medium.

Figure 2:
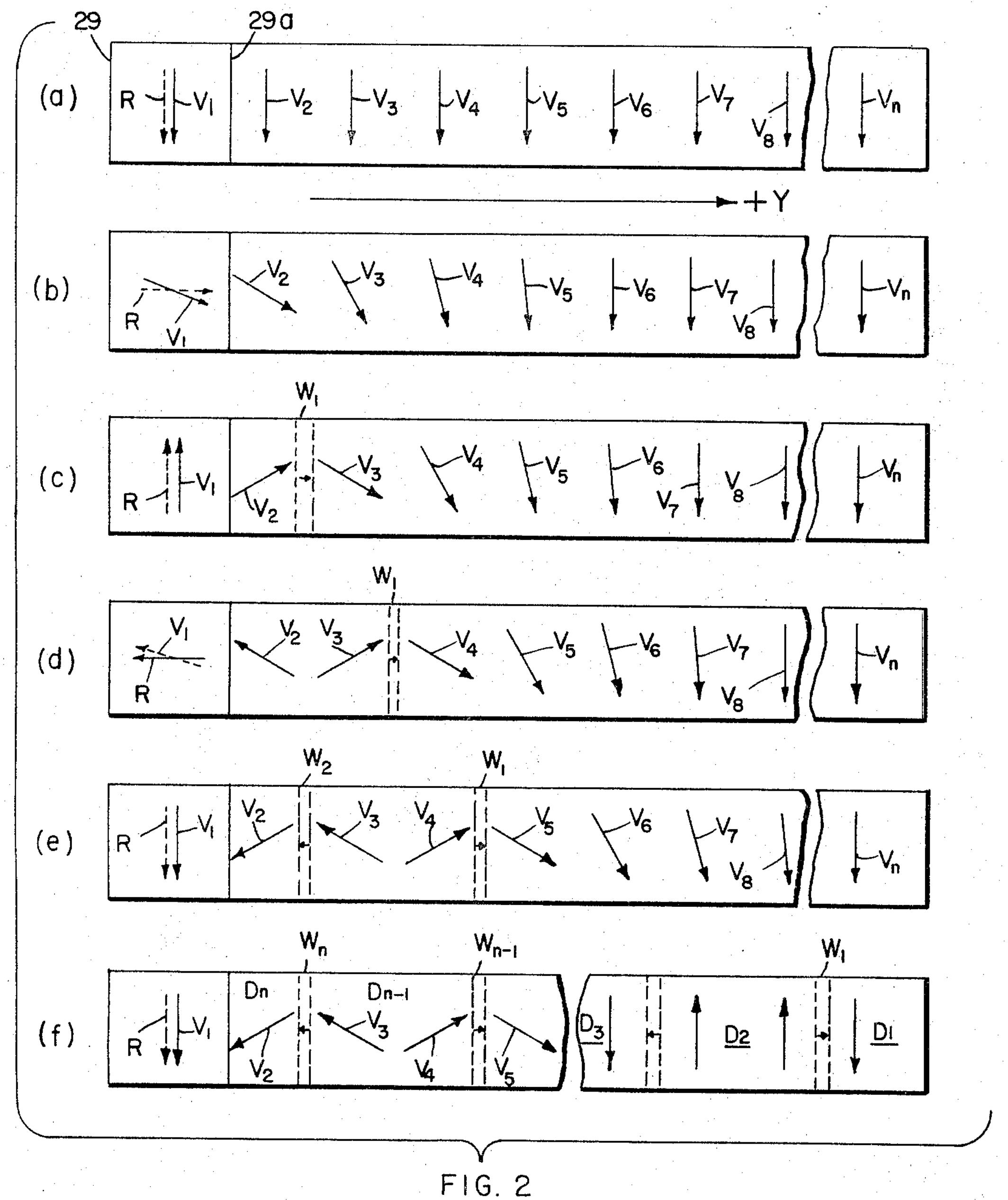
Figure 3:
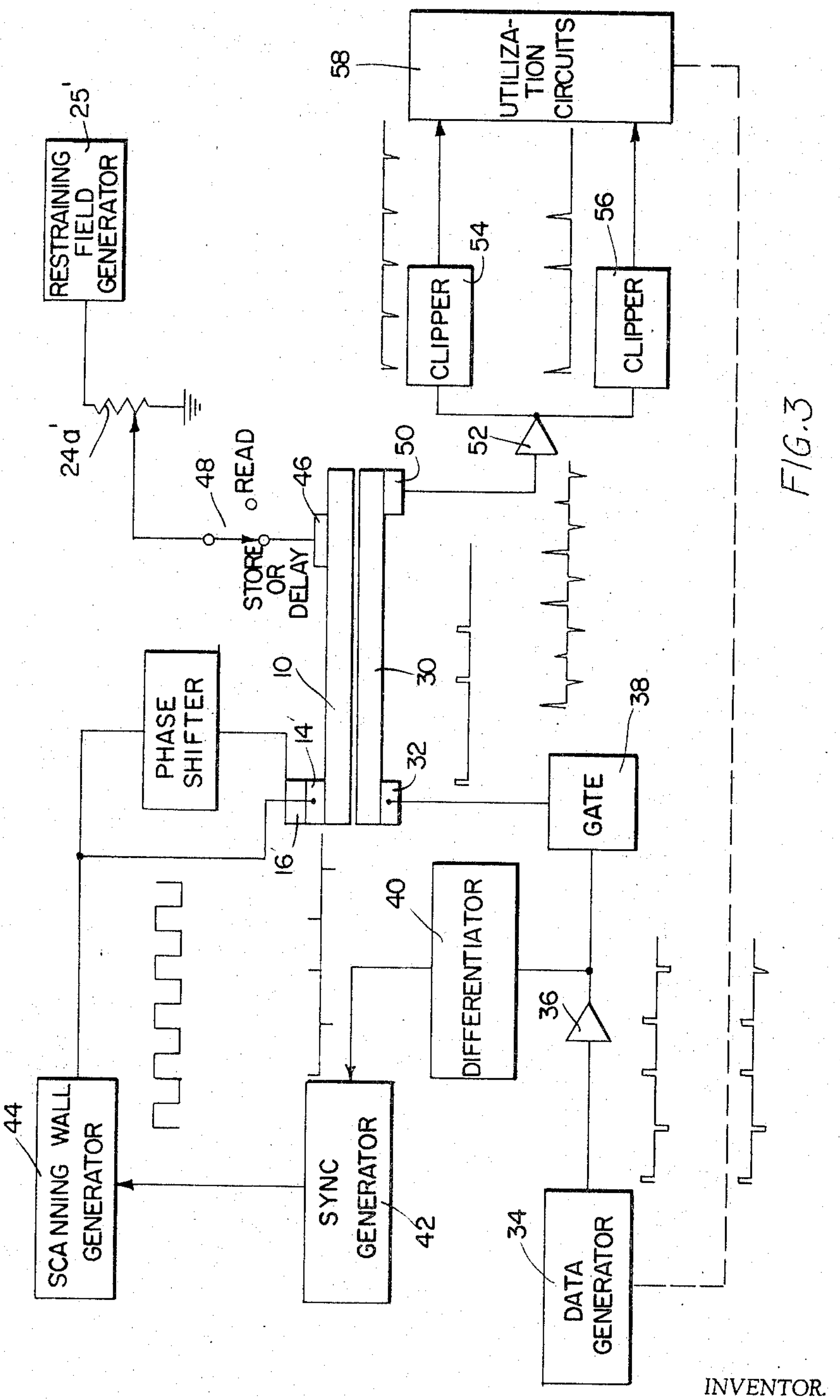

For a more complete understanding of the invention, reference is now made to the following detailed specification with reference to the accompanying drawings in which:

FIG. 1 illustrates a preferred method of, and apparatus for, generating, propagating and concentrating a sequence of domains and domain walls in an anisotropic magnetic medium;

FIGS. 2(*a*) through (*e*) are idealized plan views of the magnetic medium of FIG. 1 showing the manner in which domains and domain walls are generated and propagated in such medium;

FIG. 3 is a greatly simplified, partially block and partially schematic, drawing of data processing apparatus according to a preferred embodiment of the invention, portions of such apparatus being greatly simplified and enlarged the better to show the principles of this invention.

Referring now to FIG. 1 it may be seen that a film of a ferromagnetic material, as "Permalloy" (83% nickel-17% iron) is supported on a non-magnetic base 12, as a sheet of glass. The film 10 preferably is deposited on the base 12 by known vacuum deposition techniques to a convenient thickness, say between 100 and 10,000 angstroms, in a steady magnetic field. Under such conditions it is known that the anisotropic characteristics of the ferromagnetic material may be adjusted as desired and that the easy direction of magnetization of the film 10 may be set by the direction of the steady magnetic field, as, for example, substantially parallel to X coordinate of the coordinate system shown at the upper left portion of FIG. 1.

Domain forming electrodes 14, 16, fabricated from any electrically conductive non-magnetic material, are fixed, as by cementing, substantially parallel to the X coordinate and adjacent to the left hand side of film 10. The domain forming electrodes 14, 16 are separated from the film 10 (and from each other) by electrically insulating spacers 15, 15*a*, as shown. Domain forming electrode 14 is connected, in series with a variable resistor 14*a*, across the output of any known source 17 of alternating current. Preferably the source 17 is of the type which produces a sinusoidal waveform output. Domain forming electrode 16 is connected, in series with a variable resistor 16*a*, across the output of a phase shifter 19, as a capacitor-resistor network. The latter element in turn is energized by the source 17 and so adjusted that its output waveform may be shifted substantially 90° from the phase of its input. Thus, the phase of the current through domain forming electrode 14 and the phase of the current through domain forming electrode 16 may be separated substantially 90°.

Restraining field electrodes 22, 24, fabricated from any electrically conductive non-magnetic material, are fixed, as by cementing, to the film 10 substantially parallel to the X coordinate and spaced from the domain forming electrodes 14, 16 along the length of film 10. The restraining field electrodes 22, 24 are separated from the film 10 (and from each other) by electrically insulating spacers 23, 23*a*. Restraining field electrode 22, in series with a variable resistor 22*a*, and restraining field electrode 24, in series with a variable resistor 24*a*, in turn are connected to the output of a source 25 of current. It should be noted that the source 25 may take any one of many known forms. For example, source 25 may be a conventional DC amplifier.

The operation of the apparatus illustrated in FIG. 1 may best be explained by referring to FIG. 2 along with FIG. 1. Assuming the entire film 10 to be oriented initially in the +X direction, it is clear that when the source 17 is energized, separate currents flow through domain forming electrodes 14, 16, setting up separate time-varying magnetic fields around each such electrode. Such magnetic fields, however, obviously may be considered to combine to produce a resultant field R. The phase difference between the currents and the relative directions of such currents in the domain forming electrodes 14, 16, in the illustrated case, are such that the resultant field R rotates in the X–Y plane of the coordinate system shown in FIG. 1 at an angular speed which is directly proportional to the frequency of the source 17. It follows then, that by proportioning the maximum values of the magnetic fields around the domain forming electrodes 14, 16 (as by adjusting variable resistor 14*a* and/or variable resistor 16*a*), the magnaitude of the resultant field R may be made to remain at a substantially constant value or to vary periodically as the direction of the field R changes. Ordinarily it will be advantageous to have the magnitude of the resultant field R vary peridically in accordance with its angular position with respect to the axis of anisotropy of the film 10. Such a periodically varying field, of course, is desirable when it is used to rotate the direction of magnetization of anisotropic magnetic medium at a substantially constant rate.

Referring now to FIG. 2 in particular, it is seen that the resultant field R may be considered to have effective limits along the film 10 as designated by the numerals 29, 29*a*. As the resultant field R rotates, say in a counterclockwise direction, the magnetization of the portion of the film 10 within the effective limits 29, 29*a* of the resultant field R also rotates, as shown by the solid arrow $V_1$ in FIGS. 2(*b*) through (*f*). It is known that rotation of a single one, or of a group of magnetization vectors in an anisotropic magnetic medium in which the magnetization vectors are initially aligned is reflected in rotation, of like sense but smaller amount, of other magnetization vectors in such a medium. It follows, then, that rotation of the magnetization vector represented by the solid arrow $V_1$ is accompanied by rotation of the magnetization vectors represented by the arrows $V_2$, $V_3$ . . . $V_n$ in the manner shown. Thus, as may be seen in FIGS. 2(*a*) through 2(*e*), continuous rotation of the resultant field R in the plane of the film 10 causes successive magnetization vectors $V_2$, $V_3$ . . . $V_n$ to rotate until, as shown in FIG. 2(*f*), three domains $D_1$, $D_2$, $D_3$ are formed. Further, since it is manifestly impossible for discontinuities to exist in the magnetic field between adjacent domains, fields such as are shown at the domain walls $W_1$, $W_2$ are created concurrently with the formation of the domains $D_1$, $D_2$, $D_3$. Each such wall, of course, has a fringe field associated with it, each fringe field extending outwardly from the surface of the film 10. In other words, domain walls $W_1$, $W_2$ are the so-called "Neel walls" although the so-called "Bloch walls" may be equally effective. Since successive domain walls $W_1$, $W_2$ are magnetized in opposite directions, repulsion forces exist between the two. However, since domain wall $W_2$ cannot move to the left against resultant field R, the effect of the repulsion force is to force domain wall $W_1$ to move to the right. Further, when the third domain wall $W_3$ is created by additional rotation of the resultant field R, domain wall $W_2$ is, for a similar reason, forced to move to the right and, at the same time, domain wall $W_1$ is kept moving.

After $n$ revolutions of the resultant field R, the situation illustrated in FIG. 2(*f*) obtains. That is, an equilibrium condition is attained wherein a plurality of domains $D_1 \ldots D_n$ exits, each such domain being separated from each other by domain walls $W_1 \ldots W_{n-1}$. In such condition the domains and domain walls (together with the fringe fields associated with each domain and domain wall, not shown) move toward the right at a constant velocity $V_o$ and the domain density in the film 10 is constant. This condition is the "normal equilibrium" condition.

When a restraining field $\phi_r$ is generated by appropriately energizing the restraining electrodes 22, 24, shown in FIG. 1, such field couples to a portion of the film 10 to disturb the magnetic condition thereof. It may be hypothesized that the effect of the restraining field $\phi_r$ is to vary the coercivity of the film 10 within the effective limits of such a field. Under such conditions, further movement of the domain wall $W_1$ to the right is not possible. Since, however, new domains and doman walls are being continuously generated and propagated by the action of the domain forming electrodes 14, 16 as described hereinbefore, more and more domains and domain walls are formed in the film 10 between the restraining electrodes 22, 24 and the domain forming electrodes 14, 16, thus increaisng the domain density (and, of course, the domain wall density) in that portion of the film 10. There is, of course, a limit to the density of domains which can be packed into any magnetic medium such as the film 10. In practice, any one of the three following effects may limit the density of domains in the film 10:

(a) "Slippage" at the domain forming electrodes 14, 16, or adjacent thereto, when the resultant field R is not strong enough to form oppositely magnetized domains in the film;

(b) "Leakage" when the restraining field $\phi_r$ is not strong enough to stop movement of the domains; and (c) "Annihilation" of certain domains and the domain walls associated therewith when both the resultant field R and the restraining field $\phi_r$ are extremely large (so as to obviate either "slippage" or "leakage") and the magnetization of certain domains reverses spontaneously.

It may be seen from the foregoing that there is an equilibrium condition (for a given resulting field R, restraining field $\phi_r$ and film 10) in which the density of the domains and domain walls in the portion of the film 10 between the resulting field R and the restraining field $\phi_r$ is a maximum. In such an equilibrium condition (hereinafter referred to as the "restrained equilibrium" condition) the density of the domains and domain walls in the film 10 is greater than the density of domains and domain walls of the film 10 when the film 10 is in its "normal equilibrium" condition.

Referring now to FIG. 3, it should be recognized that, for clarity, many mechanical details, as the various electrically insulating spacers and transducers shown in detail in FIG. 1, have been omitted or simplified. It is to be understood therefore, that such mechanical details should be incorporated in a practical embodiment of the apparatus shown in FIG. 3. Further, it should be understood that, since the design and construction of each one of the sub-assemblies indicated in block form in FIG. 3 is well known in the art, reference will be made to such sub-assemblies only to the extent required for an understanding of the invention.

With the foregoing in mind, the particular structure illustrated in FIG. 3 may now be described. Thus, in addition to the film 10 and its associated transducers, the storage assembly of FIG. 3 comprises a magnetic storage medium 30 comprising a film of an anisotropic magnetic material, as an alloy of iron-nickel (50% Fe-50% Ni), having a higher coercivity than the magnetic material of the film 10, together with a domain forming transducer 32 and circuitry now to be described.

Any known data generator 34, as a controlled pulse generator, produces electrical signals characteristic of data to be processed. Let us assume here that a series of pulses representative of the binary number 01011 is produced by the data generator 34, such number being in the form of negative and positive pulses (where a negative pulse represents a "0" and a positive pulse represents a "1"). The pulse train is fed through a conventional buffer amplifier 36, as a cathode or emitter follower. The output of the buffer amplifier 36 is led to a conventional positive gate 38 and to a conventional sync generator 42 through a differentiator 40. That is, the positive gate 38 may be a buffer amplifier having its output clamped to ground through a diode of such polarity that negative-going pulses are eliminated and the sync generator may be a bistable multivibrator having its period adjusted so as to be equal, approximately, to one half the time between data pulses. The output of the positive gate 38 (which is of the form shown in FIG. 3 beneath the domain forming transducer 32) may be applied directly to domain forming transducer 32, so that pulses of current corresponding to the "1's" in the data flow therethrough. It should be recognized, however, that in a practical case it may be desirable to insert adjusting means, as a potentiometer and biasing means therefor, or delay means, as a multivibrator, in circuit with the domain forming transducer 32. Such components are, however, well known in the art and may be easily added by one having ordinary skill.

As previously mentioned, the sync generator may simply be a conventional bistable multivibrator which may be triggered by either a positive or negative trigger pulse. Thus, although the output of the buffer amplifier 36 upon passing through the differentiator 40 is converted to a train of trigger pulses (as shown adjacent the input of the sync generator 42) in accordance with the data being processed, the sync generator output is a square wave of substantially constant period (as shown adjacent to the output line of the sync generator 42). The square wave output waveform of the sync generator 42 (which waveform is synchronized with the time intervals between successive ones of the pulses representative of the data being processed regardless of the polarity of each such pulse) is then fed into a scanning wall generator 44 wherein a sinusoidal waveform output is produced. It will be evident that the scanning wall generator 44 may take several forms. Thus the scanning wall generator 44 may consist essentially of a low pass filter wherein the harmonics of the output waveform of the sync generator 42 are attenuated. In the alternative, the scanning wall generator 44 may consist essentially of a pulsed oscillator locked to a particular portion, say the positive-going sides, of the output waveform of the sync generator 42. Whatever the exact form of the scanning wall generator 44, it is necessary only that it produce a sinusoidal output phase-locked with the pulses representative of the data being processed. It will now be apparent that the scanning wall generator 44 is analogous to the source 17 of FIG. 1. Therefore, when the sinusoidal output waveform of the scanning wall generator 44 is applied to the domain forming electrodes 14', 16' as shown, a resultant field similar to the resultant field R, discussed previously, is set up to rotate the magnetization of the portion of the film 10 within the effective limits of such a resultant field, thus forming alternately magnetized moving domains and domain walls as previously explained.

It will now be clear that when a pulse representative of a "1" passes through the positive gate 38, a switching field is created around the domain forming electrode 32 so that the magnetization of the portion of the magnetic storage medium 30 within the effective limits of such field is switched and a concomitant domain wall is created in the magnetic storage medium 30. Since the film 10 and the magnetic storage medium 30 are close to each other, and since, as previously explained, a moving domain wall then exists in the film 10, conditions are favorable to magnetic coupling between the fringe field of a domain wall in the magnetic storage medium 30 and a domain wall in the film 10 when a "1" is to be processed. In fact, such coupling does take place and the domain wall in the magnetic storage medium 30 is moved along with the domain wall in the film 10 to which it is coupled. (The desirability of delay means, as a bistable multivibrator triggered only by pulses representative of "1's" and having a period equal to at least one half of the time between successive pulses out of the data generator 34 and less than such time, will be evident.) If a "0" is to be processed, no switching of the magnetic storage medium 30 takes place, so the then created domain wall in the film 10 moves by itself as previously explained.

The restraining field generator 25' and the circuitry associated therewith, as a potentiometer 24*a*', selector switch and restraining field electrode 46 may be generally similar to the corresponding elements shown in FIG. 1. Consequently when the selector switch 48 is positioned in its "store or delay" position, current from the restraining field generator 25' flows through the potentiometer 24*a*' to the restraining field electrode 46 to set up a restraining field in the film 10 as described hereinbefore. It is clear now that the restraining field may be of such magnitude as to prevent movement of domain walls in the film 10 and, consequently, stopping movement of any domain walls in the magnetic storage medium 30 coupled to such domain walls in the film 10. The process, of course, may be continued until the "restrained equilibrium" condition is attained, in which condition the density of domains and domain walls in the portion of the film 10 (and the magnetic storage medium 30) is higher than the possible density thereof in the "normal equilibrium" condition. In other words, data is stored in the magnetic storage medium 30 in the form of closely-packed alternately magnetized domains.

When it is desired to read out the data stored in the magnetic storage medium 30, the selector switch 48 is placed in its "read" position, thereby breaking the circuit energizing the restraining field electrode 46 and causing the restraining field to disappear. Normal movement of domains and domain walls in the film 10 and domains and domain walls in the magnetic storage medium 30 is then reinitiated. The fringe fields of the successive domain walls link an output transducer 50 (which may be a coil of wire surrounding the film 10 and the magnetic storage medium 30) producing a signal waveform such as is illustrated adjacent to a buffer amplifier 52. Such a waveform, as may be seen, contains data information in the form of high amplitude positive pulses (each indicative of a "1" in data being processed) resulting from coincidence of a domain wall in the magnetic storage medium 30 with a domain wall in the film 10 and a low amplitude positive and negative pulses indicative of a cycle of the scanning wall generator 44 and of a "0" in the data being processed. Consequently, the pulses may be separated from each other in known clipping circuits 54, 56 and the original pulse train output of the data generator 34 may be reconstituted in an appropriate utilization circuit 58.

If the system just described is to be used as a recirculating register then the selector switch 48 may be left in its "store-delay" position and the potentiometer 24*a*' adjusted so that the restraining field is of insufficient strength to stop the movement of domains and domain walls in the film 10 and the magnetic storage medium 30. Under such conditions successive domains and domain walls "leak" past the restraining field and are transduced into electric pulses as before. The output of the utilization circuit 58 may then be recirculated through the lead shown as a broken line in FIG. 3 to the data generator 34 to recirculate the data.

If it is desired to use the system shown in FIG. 3 to delay a pulse train, then the mode of operation is quite similar to the recirculating register mode just described. It will be noted, however, that adjustment of the potentiometer 24*a*' determines the delay to which each pulse is subjected and that the range of delay is set primarily by the magnetic characteristics of the film 10 and the magnetic storage medium 30. It is evident, however, that the magnitude of the current upon which the restraining field depends may be varied within wide limits thus allowing the desired delay to be set within similarly wide limits.

Having now described a preferred embodiment of the invention and the various modes of operation thereof, the advantages to be derived from use of the invention will now be clear. Thus, since the magnetic mediums may be operated in their restrained equilibrium condition, extremely high storage density of data in such mediums are readily attained. Further, the circuitry associated with the storage mediums is both simple and easily adjusted, there being a minimum chance of interaction between the various portions of such circuitry to cause unwanted effects. In addition, also, the described circuitry is obviously adapted to simple adjustment to control the operational characteristics of the apparatus within wide limits.

It will be obvious to those having skill in the art to which this invention pertains that many changes and modifications of the preferred embodiment of the invention may be made without changing the concepts of the invention. That is, the exact form of the various elements making up the magnetic storage medium and the circuitry used to energize such medium is not essential to the invention so long as separate means are provided: (a) To generate and propagate successive domain walls in a scanning medium; generate domain walls representative of data being processed in a magnetic storage medium adjacent to the scanning medium in a timed relation with the moving domain walls in the scanning medium so that, as each domain wall is generated in the storage medium, magnetic coupling between the external fields of each such wall and the external field of a domain wall in the scanning medium results in movement of the domain wall in the storage medium; means for controlling the speed at which the domain walls move in both the scanning medium and the storage medium; and means for transducing, whenever desired, the external magnetic field around each domain wall in the storage medium into an electric signal corresponding to the electric signal originally controlling the formation of domain walls in the storage medium.

In view of the foregoing, it is thought that the invention should not be restricted to its illustrated and described embodiment, but rather should be limited only by the spirit and scope of the appended claims.

What is claimed is:

1. Data processing apparatus wherein electric signals representative of data being processed are stored in a magnetic storage medium in the form of alternately magnetized domains, comprising:

(a) a first electrode disposed adjacent to a first portion of the magnetic storage medium and means for energizing the first electrode with the electric signals to create electromagnetic fields successively to switch the direction of magnetization of the first portion of the magnetic storage medium, (b) means for then rotating, in accordance with the direction of magnetization of such first portion, the direction of magnetization of successive portions of the magnetic storage medium to form alternately magnetized domains therein representing the electric signals, said means for rotating including a second magnetic medium overlying the magnetic storage medium and further including means for applying a rotating electromagnetic field to create successive moving domains in the second magnetic medium, separate ones of the fringe fields associated with such moving domains magnetically coupling to the fringe field associated with individual ones of the domains in the magnetic storage medium, (c) means for applying a steady electromagnetic field to the second magnetic medium at a second portion thereof to control the density of the alternately magnetized domains between the first and second portions of the magnetic storage medium, and (d) means for generating, in accordance with the alternately magnetized domains stored in the magnetic storage medium, an output electric signal representative of the electric signals originally forming such alternately magnetized domains.

2. Data processing apparatus as in claim 1 wherein the magnetic storage medium and the second magnetic medium are each a film of an anisotropic magnetic medium having a thickness between 100 and 10,000 angstrom units.

3. Data processing apparatus wherein electric signals representative of data being processed are stored, at least temporarily, in a storage medium comprising:

(a) a scanning medium and a storage medium, each such medium being fabricated from an anisotropic magnetic material and having an easy direction of magnetization, (b) means supporting the scanning medium and the storage medium in a side-by-side relationship with respect to each other, the easy direction of magnetization of the two mediums being substantially parallel to each other, (c) means for switching the magnetization of a first portion of the storage medium in accordance with the electric signals representative of data being processed to form successive domain walls at the intersection between such first portion and the remainder of the storage medium, each such domain wall being indicative of a single bit of data being processed, (d) means for periodically rotating the magnetization of a second portion of the scanning medium adjacent to the first portion of the storage medium to generate successive moving domain walls in the scanning medium, the direction of movement of such successive moving domain walls in the remainder of the scanning medium being substantially orthogonal to the easy direction of magnetization thereof, successive ones of domain walls in the storage medium being magnetically coupled to successive ones of the domain walls in the scanning medium to cause successive ones of the domain walls in the storage medium to move therethrough, (e) means for increasing the coercivity of a second portion of the scanning medium removed from the first portion thereof to vary the speed of the walls in both the scanning medium and the storage medium and increase the density of the domain walls in both such mediums, (f) means for producing an output signal in accordance with successive ones of the domain walls in the storage medium to reproduce the data being processed.

4. Data processing apparatus as in claim 3 wherein the scanning medium and the storage medium are each in the form of a film of an anisotropic magnetic material having a thickness between 100 and 10,000 angstroms, the coercivity of the material of the storage medium being greater than the coercivity of the scanning medium.

5. Apparatus for delaying an electric signal comprising:

(a) a first and a second magnetic medium, each such medium being fabricated from an anisotropic magnetic material, (b) means for supporting the two magnetic mediums in juxtaposition with each other so that the easy direction of magnetization each is substantially aligned with the easy direction of magnetization of the other, (c) means for rotating the magnetization of a first portion of the first magnetic medium to generate a series of moving domain walls therein, the direction of movement being substantially orthogonal to the easy direction of magnetization of the first magnetic medium, (d) means for switching, in accordance with the electric signal to be delayed, a first portion of the second magnetic medium to generate domain walls therein, the fringe field of each such domain wall being magnetically coupled to the fringe field of a single one of the domain walls in the first magnetic medium so that the domain walls in the two magnetic mediums move together, (e) means for varying the speed of the domain walls in a second portion of the first magnetic medium to vary the speed at which the domain walls move in the second magnetic medium, and, (f) means for producing an output electric signal in accordance with the so-varied domain walls in the second magnetic medium.

References Cited

UNITED STATES PATENTS

| | | | |
|---|---|---|---|
| 3,137,845 | 6/1964 | Snyder | 340—174 |
| 3,295,114 | 12/1966 | Snyder | 340—174 |

BERNARD KONICK, *Primary Examiner.*

STANLEY URYNOWICZ, *Examiner.*